United States Patent
Okubo et al.

(10) Patent No.: US 7,590,315 B2
(45) Date of Patent: Sep. 15, 2009

(54) OPTICAL WAVEGUIDE AND OPTICAL MODULE USING THE SAME

(75) Inventors: Miwa Okubo, Kanagawa (JP); Takahiro Arakida, Kanagawa (JP); Hidehiko Nakata, Kanagawa (JP); Terukazu Naruse, Kanagawa (JP); Momoko Eguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/945,726

(22) Filed: Nov. 27, 2007

(65) Prior Publication Data

US 2008/0138007 A1    Jun. 12, 2008

(30) Foreign Application Priority Data

Dec. 8, 2006   (JP)   ............... 2006-332026

(51) Int. Cl.
    *G02B 6/12*    (2006.01)
(52) U.S. Cl. .......................................... 385/14; 385/78
(58) Field of Classification Search ................ None
    See application file for complete search history.

(56) References Cited

U.S. PATENT DOCUMENTS

| | | | | |
|---|---|---|---|---|
| 4,168,520 A | * | 9/1979 | Coleman et al. | 361/308.1 |
| 4,186,409 A | * | 1/1980 | McMullin | 257/117 |
| 4,784,457 A | * | 11/1988 | Finzel | 385/59 |
| 4,818,059 A | * | 4/1989 | Kakii et al. | 385/65 |
| 5,812,720 A | * | 9/1998 | Dannoux | 385/115 |
| 6,435,734 B2 | * | 8/2002 | Okada et al. | 385/88 |
| 6,839,474 B2 | * | 1/2005 | Steinberg et al. | 385/14 |
| 6,848,839 B2 | * | 2/2005 | Steinberg | 385/88 |
| 6,905,569 B2 | * | 6/2005 | Kim et al. | 156/293 |
| 7,203,410 B2 | * | 4/2007 | Wei et al. | 385/137 |
| 2001/0031117 A1 | * | 10/2001 | Steinberg | 385/88 |
| 2003/0007754 A1 | * | 1/2003 | Terashima | 385/92 |
| 2003/0021548 A1 | * | 1/2003 | Luther et al. | 385/86 |
| 2003/0152327 A1 | * | 8/2003 | Tanaka et al. | 385/34 |
| 2004/0033733 A1 | * | 2/2004 | Feldman | 439/843 |
| 2005/0036740 A1 | * | 2/2005 | Itabashi et al. | 385/50 |
| 2005/0047716 A1 | * | 3/2005 | Arakida et al. | 385/31 |
| 2005/0105857 A1 | * | 5/2005 | Ishigami et al. | 385/78 |
| 2005/0182353 A1 | * | 8/2005 | Schmidberger et al. | 604/43 |
| 2006/0008212 A1 | * | 1/2006 | Wada et al. | 385/80 |
| 2006/0140546 A1 | * | 6/2006 | Nakata et al. | 385/88 |
| 2006/0291782 A1 | * | 12/2006 | Carpenter et al. | 385/49 |
| 2007/0081770 A1 | * | 4/2007 | Fisher | 385/92 |

FOREIGN PATENT DOCUMENTS

| | | | | |
|---|---|---|---|---|
| JP | 59154413 A | * | 9/1984 |
| JP | 01172911 A | * | 7/1989 |

(Continued)

*Primary Examiner*—Frank G Font
*Assistant Examiner*—Peter Radkowski
(74) *Attorney, Agent, or Firm*—Sonnenschein Nath & Rosenthal LLP

(57) ABSTRACT

An optical waveguide contains a core layer in which light is transferred, and a cladding layer that clads the core layer. The core layer has an inclined end surface across a direction where the core layer extends. The inclined end surface reflects light from the core layer to outside or light from the outside to the core layer. The cladding layer has an end portion that extends to the inclined surface of the core layer. The cladding layer includes a system that prevents an adhesive agent from flowing out.

6 Claims, 9 Drawing Sheets

FOREIGN PATENT DOCUMENTS

| | | | |
|---|---|---|---|
| JP | 2582066 | | 11/1996 |
| JP | 09-318840 | | 12/1997 |
| JP | 11-038270 | | 2/1999 |
| JP | 3161599 | | 2/2001 |
| JP | 2003098379 A | * | 4/2003 |
| JP | 2004233687 A | * | 8/2004 |
| JP | 2005092013 A | * | 4/2005 |
| JP | 2005265885 A | * | 9/2005 |
| JP | 2005266657 A | * | 9/2005 |
| JP | 2007072007 A | * | 3/2007 |

* cited by examiner

OPTICAL WAVEGUIDE AND OPTICAL MODULE USING THE SAME

CROSS REFERENCES TO RELATED APPLICATIONS

The present invention contains subject matter related to Japanese Patent Application JP 2006-332026 filed in the Japanese Patent Office on Dec. 8, 2006, the entire contents of which being incorporated herein by reference.

BACKGROUND OF THE INVENTION

1. Field of the Invention

The present invention relates to an optical waveguide and an optical module using the same. More particularly, it relates to an optical waveguide and an optical module that are available for an information transmission channel between boards or chips in electronic equipment.

2. Description of Related Art

Any information transmission has been performed between the boards or the chips in any electronic equipment using any electric signals. Any optical interconnection technologies, however, have developed in order to implement any information transmission with a large-capacity at extremely high speeds. Particularly, an optical module of a waveguide type using a planar optical waveguide has proposed.

For example, Japanese Patent Application Publication No. H11-38270 has disclosed an optical waveguide unit as the optical module of waveguide type. In the optical waveguide unit, an end surface of an optical waveguide is inclined by 45 degrees as to be functioned as a reflection surface and an optical element can be positioned under the optical waveguide opposite to the reflection surface.

According to such the optical waveguide unit, the optical element is connected to an optical fiber through the optical waveguide. The optical waveguide is fixed on a substrate together with a ferrule into which the optical fiber is inserted. The holding member for the optical waveguide holds the end portion, to be connected to the ferrule, of the optical waveguide on the substrate. The holding member for the ferrule, which is separated from the holding member for the optical waveguide, holds the ferrule on the substrate.

Japanese Patent Application Publication No. H09-318840 has disclosed a planar optical waveguide in which an optical fiber is connected to an optical waveguide so that they can be held with the optical fiber being thrust against an end surface of the optical waveguide. In this optical waveguide, the optical fiber is held on a holding member such as a glass block and then, the holding member holding the optical fiber is thrust against the end surface of the optical waveguide, thereby enabling the optical fiber to be connected to the optical waveguide.

Japanese Patent Publication No. 2582066 has disclosed an optical functional device in which an optical fiber is connected to an optical waveguide. In this optical functional device, a glass plate covers a silicon substrate in which a core channel is formed, and an optical waveguide is formed by pouring materials for the optical waveguide into the core channel. The optical fiber is inserted into the V-shaped profile channel that is formed in the silicon substrate and by thrusting the optical fiber against the optical waveguide exposed at an end surface of the glass plate, they are held so that the optical fiber can be connected to the optical waveguide.

SUMMARY OF THE INVENTION

By the way, in order to make the optical module of waveguide type miniaturized and make its mounting easy, a technology that uses a planar optical waveguide has been proposed. Such the planar optical waveguide is used with it being bonded to and fixed on the silicon substrate by adhesive agent or the like.

If, however, the planar optical waveguide is bonded to and fixed on the silicon board by adhesive agent, the optical fiber and the optical waveguide may be shifted at a position of a connection between the optical fiber and the optical waveguide and/or the optical waveguide and an optical element may get out of alignment position when an abrupt thermal shock is allied thereto because of difference in thermal expansion coefficients of the optical waveguide made of organic polymer materials and the silicon substrate made of inorganic metal materials, thereby causing any increased connection loss. This may cause any cracks in the optical waveguide.

It is difficult to restrain whole of the optical waveguide from being expanded or contracted in the optical module of waveguide type even if any glass plate or the like covers the connection between the optical fiber and the optical waveguide.

If any plate-like holding member or the like covers almost whole of the optical waveguide, it may be possible to restrain whole of the optical waveguide from being expanded or contracted. When, however, the holding member having an extensive area such that it can cover almost whole of the optical waveguide is bonded to and fixed on the optical waveguide by adhesive agent, the adhesive agent may flow out of an end surface of the optical waveguide downwardly. If the flown adhesive agent is remained on or near an inclined surface of the core layer as a reflection surface and becomes stiff, this may have an influence on the connection loss thereof.

It is thus desirable to provide an optical waveguide and an optical module using the same that are available for preventing the adhesive agent used for bonding the holding member, which restrains whole of the optical waveguide from being expanded or contracted, from flowing out.

According to an embodiment of the present invention, there is provided an optical waveguide containing a core layer in which light is transferred and a cladding layer that clads the core layer. The core layer has an inclined end surface across a direction where the core layer extends. The inclined end surface reflects light from the core layer to outside or light from the outside to the core layer. The cladding layer has an end portion that extends to the inclined surface of the core layer. The cladding layer includes a system that prevents an adhesive agent from flowing out.

In the embodiment of optical waveguide according to the invention, a recess portion or a stepwise portion is provided on the end portion of the cladding layer as the system that prevents an adhesive agent from flowing out. Such the recess portion or the stepwise portion limits an extent of flow of the adhesive agent used when a holding member is bonded to the cladding layer at the end portion of the cladding layer that extends to the inclined surface of the core layer. Thus, it is possible to prevent the adhesive agent from flowing out downward up to the inclined surface of the core layer.

According to another embodiment of the present invention, there is provided an optical module containing a board, an optical waveguide that is mounted on the board, an optical element that receives or emits the light, and a holding member that holds the optical waveguide. The optical waveguide includes a core layer in which light is transferred and a cladding layer that clads the core layer. The core layer has an inclined end surface across a direction where the core layer extends. The inclined end surface reflects light from the core layer to outside or light from the outside to the core layer. The cladding layer has an end portion that extends to the inclined surface of the core layer. The optical element is mounted on the board under the optical waveguide opposite to the inclined end surface of the core layer in the optical waveguide. The holding member is bonded to the cladding layer in the optical waveguide by adhesive agent. The cladding layer in the optical waveguide includes a system that prevents an adhesive agent from flowing out.

In the above another embodiment of the invention, according to the optical module, when the holding member is bonded to the cladding layer in the optical waveguide by adhesive agent, at least any one of a recess portion and a stepwise portion provided on the end portion of the cladding layer as the system that prevents an adhesive agent from flowing out limits an extent of flow of the adhesive agent flown between the holding member and the cladding layer at an end portion of the cladding layer that extends to the inclined surface of the core layer. Thus, it is possible to prevent the adhesive agent from flowing out towards the inclined surface of the core layer.

When receiving light from the optical element through the lower surface of the optical waveguide, the inclined surface of the core layer reflects the light therefrom to the core layer. Alternatively, when receiving light from the core layer, the inclined surface of the core layer reflects the light therefrom to the optical element through the lower surface of the optical waveguide. If any flown adhesive agent remains on or near the inclined surface of the core layer, its reflection power alters so that connection loss may be increased. However, in the above another embodiment of the optical module according to the present invention, preventing the adhesive agent from flowing out downward up to the inclined surface of the core layer enables any increase in the connection loss at the inclined surface of the core layer to be avoided.

Further, in the above another embodiment of the optical module according to the present invention, the adhesive agent can be flown into a space between the holding member and the optical waveguide up to the recess portion or the stepwise portion, so that the holding member can cover almost whole of the optical waveguide up to a vicinity of the edge of the optical waveguide. This enables the optical module to refrain from its deformation based on any expansion and contraction of the optical waveguide, which prevents the connection loss from being increased.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

The following will describe preferred embodiments of an optical waveguide and an optical module according to the present invention with reference to the accompanied drawings.

Figure 1:
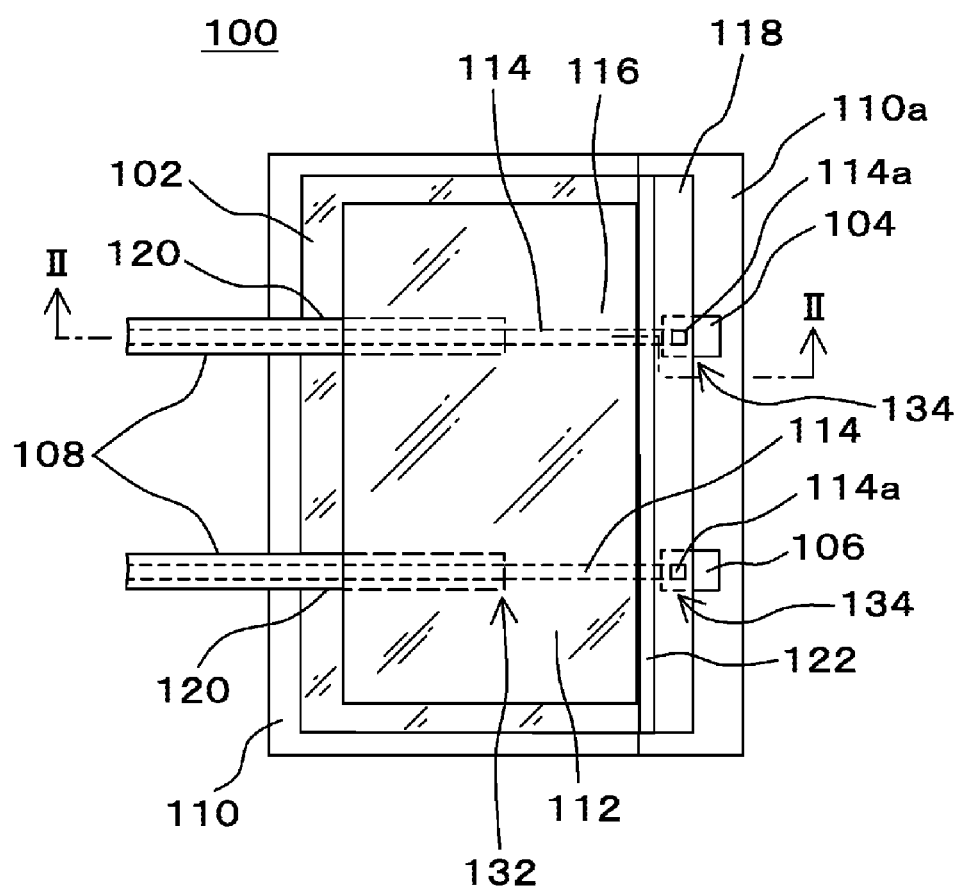
FIG. 1 is a top plan view of an embodiment of an optical module according to the invention for showing a configuration thereof.
Figure 2:
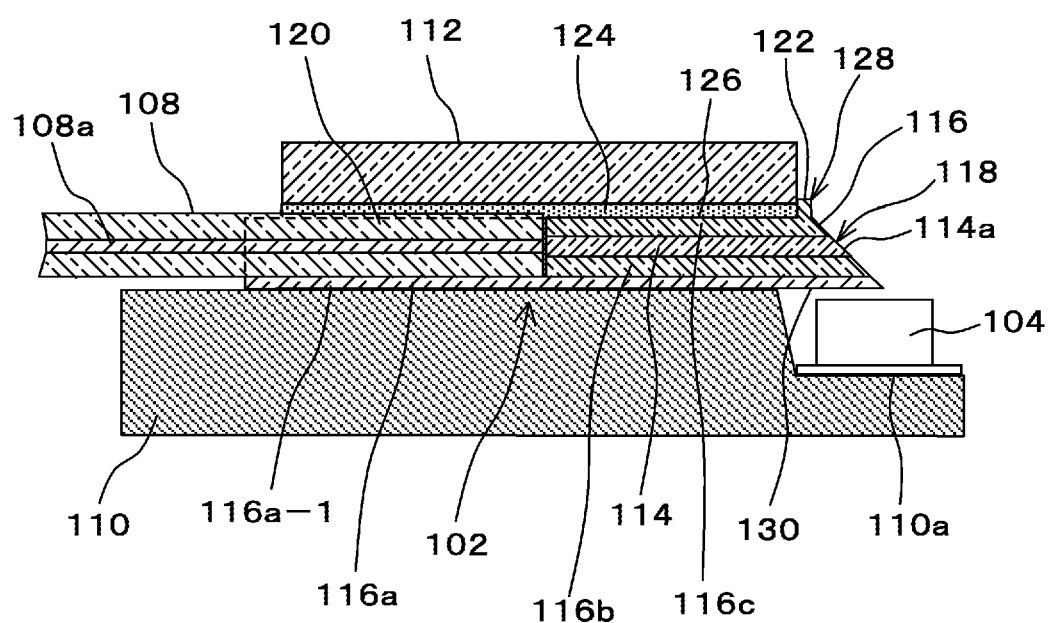
FIG. 2 is a cross-sectional view of the optical module taken on lines II-II of FIG. 1.

FIGS. 1 and 2 show a configuration of an embodiment of an optical module 100 according to the invention, which uses an embodiment of an optical waveguide 102 according to the invention.

The optical module 100 contains an optical element such as a vertical cavity surface emitting LASER (VCSEL) 104 and/or a photodiode (PD) 106, a planar optical waveguide 102 that connects each optical fiber 108 with the optical element, a board 110 that mounts the optical waveguide 102, and a holding cover 112 that holds and covers the optical waveguide 102.

The optical waveguide 102 contains at least one core layer 114 and a cladding layer 116 that clads the core layer(s) 114. The core layer(s) 114 and the cladding layer 116 are made of, for example, any photosensitive acrylic polymer materials. The cladding layer 116 contains a buffer-cladding layer 116a, an undercladding layer 116b and an overcladding layer 116c which are formed on the buffer-cladding layer 116a.

In this embodiment, two straight core layers 114 are arranged on the undercladding layer 116b in parallel and are covered by the overcladding layer 116c, so that they constitute a core-embedded optical waveguide.

In the optical waveguide 102, the cladding layer 116 has a slightly lower refractive index than that of each of the core layers 114 in order to steer the light, which enters into the core layer 114, through the core layer 114.

The optical waveguide 102 has a rectangular configuration and an inclined end surface 118 across a direction where each of the core layers 114 extends. The inclined end surface 118 has an incline of about 45 degrees on a bottom surface of the optical waveguide 102. Each of the core layers 114 has also an inclined end surface 114a across a direction where the core layer extends. The inclined end surface 114a has also an incline of about 45 degrees so that the inclined end surface 114a of each of the core layers 114 can be exposed at the inclined end surface 118 of the optical waveguide 102.

The optical waveguide 102 has at least one fiber guide groove 120 into which the optical fiber 108 is inserted at another end surface along the direction where each of the core layers 114 extends. Each of the fiber guide grooves 120 has a channel section extending in a straight line from an end of each of the core layers 114 up to the above another end surface of the optical waveguide 102 opposite to the inclined end surface 118 along the direction where each of the core layers 114 extends. An end surface of each of the core layers 114 is exposed at each of the fiber guide grooves 120.

Each of the fiber guide grooves 120 may be formed as a channel having a depth from an upper surface of the overcladding layer 116c to a lower surface of the undercladding layer 116b within a thickness of the optical waveguide 102. The buffer-cladding layer 116a is configured as a bottom of such the channel. Such the depth is configured as to be slightly smaller than a diameter of the optical fiber 108. A width of such the channel is configured as to be almost identical to the diameter of the optical fiber 108.

This prevents any gaps from occurring between an outer circumference of the optical fiber 108, and an inner wall of the undercladding layer 116b and the overcladding layer 116c, which constitutes the fiber guide groove 120, when the optical fiber 108 is inserted into the fiber guide groove 120, thereby limiting any radical movement of the optical fiber 108.

A position of each of the fiber guide grooves 120 is set so that an optical axis of a core 108a of each of the optical fibers 108 can be aligned with that of each of the core layers 114 when the optical fiber 108 is inserted into the corresponding fiber guide groove 120.

Thus, the optical waveguide 102 is adjusted so that, when the optical fiber 108 is inserted into the corresponding fiber guide groove 120, the optical axis of a core 108a of each of the optical fibers 108 can be aligned with that of each of the core layers 114, thereby enabling the optical fiber 108 to be optically coupled with the corresponding core layer 114. This allows the optical waveguide 102 and the optical fibers 108 to be coupled by means of any passive alignment with only mechanical alignment accuracy.

The optical waveguide 102 has a stepwise portion 122 for preventing an adhesive agent 124 from flowing out of an upper surface 126 of the overcladding layer 116c.

The stepwise portion 122 is an example of a system for preventing adhesive agent 124 from flowing out. The stepwise portion 122 is formed at an end portion 128 on the upper surface 126 of the overcladding layer 116c, which extends to the inclined end surface 118 of each of the core layers 114, along the inclined end surface 118.

The stepwise portion 122 is preferable to have a height from the upper surface 126 of the overcladding layer 116c, which is identical to or higher than a height of a projected portion of any of the optical fibers 108, which are inserted into the guide grooves 120, from the upper surface 126 of the overcladding layer 116c.

The board 110 mounts the optical waveguide 102 with a lower surface 116a-1 of the buffer-cladding layer 116a being formed as mounted surface thereof.

The board 110 is made of, for example, silicon (Si). A part 110a of the board 110 is lower-profiled to form a space in which the part 110a mounts the VCSEL 104 and the PD 106, under a lower surface 130 of the optical waveguide 102 that is opposite to the inclined end surface 114a of each of the core layers 114 when the board 110 mounts the optical waveguide 102.

The board 110 mounts the VCSEL 104 and/or the PD 106 on its part 110a at their appreciate positions by means of solder or the like. The optical waveguide 102 is then bonded and fixed to a predetermined position of the board 110 on which the VCSEL 104 and the PD 106 have been mounted by any adhesive agent.

When the optical waveguide 102 is bonded to the predetermined position of the board 110, the inclined end surface 114a of the core layers 114 that is exposed at the inclined end surface 118 of the optical waveguide 102 is opposed to the VCSEL 104, so that the VCSEL 104 can be coupled to the corresponding core layer 114 via its inclined end surface 114a. Alternatively, when the optical waveguide 102 is bonded to the predetermined position of the board 110, the other inclined end surface 114a of the core layers 114 that is exposed at the inclined end surface 118 of the optical waveguide 102 is opposed to the PD 106, so that the PD 106 can be coupled to the corresponding core layer 114 via its inclined end surface 114a.

The VCSEL 104 is connected to a driver integrated circuit (IC), not shown, and converts any electric signals received from the driver IC to any optical signals to emit them. The PD 106 is connected to a receiver IC, not shown, and converts any received optical signals to any electric signals to output them to the receiver IC.

Light emitted from the VCSEL 104 is launched into the lower surface 130 of the optical waveguide 102 at almost right angles. The inclined end surface 114a of the core layer 114 totally reflects the launched light to bend its optical path up to about right angles, so that the bent light can be launched into the core layer 114 and transferred to the optical fiber 108. Light transferred from any optical fibers 108 into the corresponding core layer 114 is totally reflected by the inclined end surface 114a of the corresponding core layer 114 to bend its optical path up to about right angles. The bent light can be launched from the corresponding core layer 114 to the PD 106 through the lower surface 130 of the optical waveguide 102.

The holding cover 112 holds and covers both of the optical waveguide 102 mounted on the board 110 and each of the optical fibers 108 inserted into each of the fiber guide grooves 120. The holding cover 112 is made of transparent inorganic materials such as glass and has a configuration similar to that of the optical waveguide 102. In this embodiment, the holding cover 112 has a rectangular configuration.

The holding cover 112 has an area by which a region extending from a part of each of the optical fibers 108 up to a vicinity of the inclined end surface 118 of the optical waveguide 102, particularly, an optical-element-coupling section 134 where the VCSEL 104 or the PD 106 is optically coupled with the optical waveguide 102, through a connection 132 between each of the optical fibers 108 and each of the core layers 114 in the optical waveguide 102 can be covered.

The acrylic polymeric materials constituting the optical waveguide 102 has thermal expansion coefficient of about 80 ppm/k. The glass constituting the holding cover 112 has thermal expansion coefficient of 0.4 through 10 ppm/k. Thus, the thermal expansion coefficient of the holding cover 112 is smaller than that of the optical waveguide 102.

Silicon constituting the board 110 has thermal expansion coefficient of about 2.4 ppm/k, which is more close to that of the holding cover 112 if it is compared with those of the holding cover 112 and the optical waveguide 102.

The holding cover 112 and the optical fibers 108 are bonded to the optical waveguide 102 by the adhesive agent 124. The adhesive agent 124 is injected into a space between an entire lower surface of the holding cover 112 and the upper surface 126 of the overcladding layer 116c as well as a space in the fiber guide grooves 120 around each of the optical fibers 108 inserted into the fiber guide grooves 120.

The adhesive agent 124 is also injected into a space between a forward end of each of the optical fibers 108 inserted into the fiber guide grooves 120 and an end of each of the fiber guide groves 120, exposing an end surface of each of the core layers 114 opposite to each of the inclined end surfaces 114a thereof.

Therefore, as the adhesive agent 124, any adhesive agent having a refractive index that is close to those of the cores 108a of the optical fibers 108 and the core layers 114 in the optical waveguide 102 can be used. As the adhesive agent 124, any ultraviolet (UV) cure, not thermosetting, adhesive agent can be also used to avoid adding any thermals to the optical waveguide 102 during a mounting step of the optical waveguide 102 using the adhesive agent.

In each of the connections 132, when the optical fiber 108 is inserted into the corresponding fiber guide groove 120, the core 108a of the optical fiber 108 faces the corresponding core layer 114 of the optical waveguide 102. In this moment, lying the adhesive agent 124 having a refractive index that is close to those of each of the cores 108a of the optical fibers 108 and each of the core layers 114 in the optical waveguide 102 between each of the cores 108a of the optical fibers 108 and each of the core layers 114 in the optical waveguide 102 allows any connection loss to be restrained in the connection 132 between each of the cores 108a of the optical fibers 108 and each of the core layers 114 in the optical waveguide 102.

In each of the optical-element-coupling sections 134, the stepwise portion 122 limits an extent of flow of the adhesive agent 124 injected into the space between the lower surface of the holding cover 112 and the upper surface 126 of the overcladding layer 116c, thereby preventing the adhesive agent 124 from being cured and remained with it flowing out downward on or near the inclined end surface 114a of any core layers 114.

The adhesive agent 124, however, injected into the space between the lower surface of the holding cover 112 and the upper surface 126 of the overcladding layer 116c surely reaches up to a base of the stepwise portion 122, so that the holding cover 112 can hold and cover the vicinity of the inclined end surface 118 of the optical waveguide 102.

It is to be noted that if the optical waveguide 102 is positioned with the VCSEL 104 and the PD 106, respectively, by any passive alignment using any image recognition or the like when the board 110 mounts the optical waveguide 102, any marks for indicating their reference positions, not shown, are formed on the board 110 and the optical waveguide 102.

The following will describe manufacture process of an embodiment of the optical waveguide 102 according to the invention.

The embodiment of the optical waveguide 102 according to the invention is manufactured by, for example, any photo lithography process with forming the fiber guide grooves 120.

FIGS. 3A through 5C show an example of manufacturing process of an embodiment of the optical waveguide 102 according to the invention, which will describe the manufacture process of the embodiment of the optical waveguide 102 according to the invention including the fiber guide grooves 120 and the stepwise portion 122 therein.

Figure 3A:
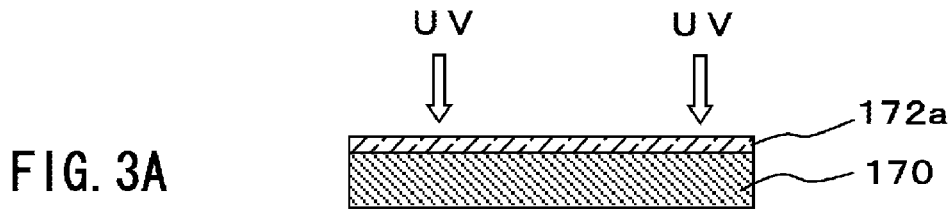
FIGS. 3A through 3E are diagrams each for showing an example of a manufacturing step of an embodiment of an optical waveguide according to the invention.

First, as shown in FIG. 3A, a thin film 172a for forming the buffer-cladding layer 116a is applied by a predetermined thickness onto a wafer substrate 170 with UV curing acrylic polymer materials constituting the buffer-cladding layer 116a. In this embodiment, the buffer-cladding layer 116a is made of materials constituting the cladding layer 116. It is to be noted that the buffer-cladding layer 116a may be made of materials constituting the core layers 114.

Next, UV is irradiated toward the thin film 172a for forming the buffer-cladding layer 116a so that the thin film 172a can be cured. The cured thin film 172a is then treated by heat so as to be formed as the buffer-cladding layer 116a.

Figure 3B:
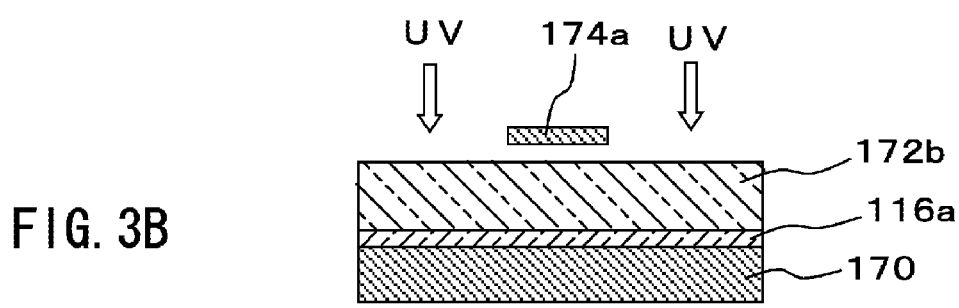

Further, as shown in FIG. 3B, a thin film 172b for forming the undercladding layer 116b is applied by a predetermined thickness onto the buffer-cladding layer 116a formed on the wafer substrate 170 with UV curing acrylic polymer materials constituting the undercladding layer 116b.

Additionally, UV is irradiated toward the thin film 172b for forming the undercladding layer 116b via a photo mask 174a by which patterns of the fiber guide grooves 120 can be formed as shown in FIG. 1, so that the thin film 172b other than the portions to be formed as the fiber guide grooves 120 can be cured.

Figure 3C:
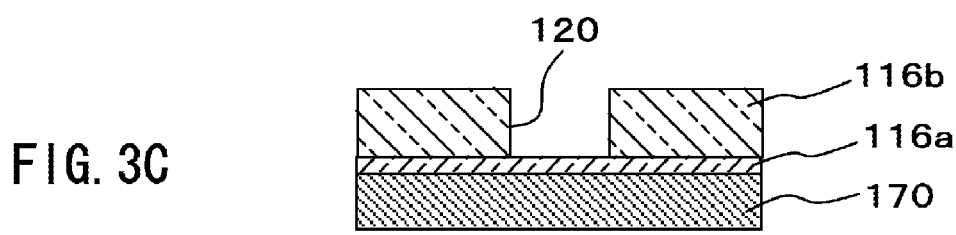

As shown in FIG. 3C, the thin film 172b other than the cured portions thereof is developed by, for example, solution as to be removed therefrom, thereby forming the fiber guide grooves 120. The thin film 172b in which the fiber guide grooves 120 have been formed is treated by heat as to be formed as the undercladding layer 116b. It is to be noted that the solution such as tetramethyl ammonium hydroxide (TMAH) solution is used for the development.

Figure 3D:
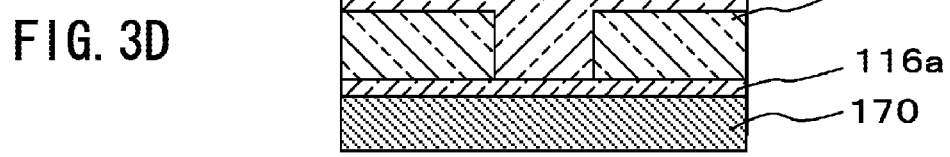

As shown in FIG. 3D, a thin film 178 for forming the core layers 114 is applied by a predetermined thickness onto the undercladding layer 116b formed on the buffer-cladding layer 116a with UV curing acrylic polymer materials constituting the core layers 114.

UV is then irradiated toward the thin film 178 for forming the core layers 114 via a photo mask 174b by which patterns of the core layers 114 can be formed as shown in FIG. 1, so that the portions of the thin film 178 to be formed as the core layers 114 can be cured.

Figure 3E:
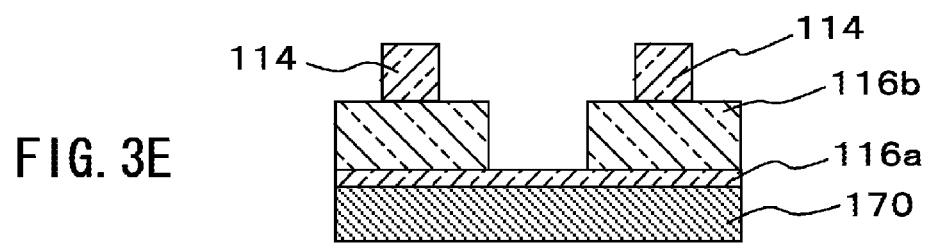

As shown in FIG. 3E, the thin film 178 other than the cured portions thereof is developed by solution as to be removed therefrom. Such the removed thin film 178 is treated by heat as to be formed as the core layers 114 with predetermined patters as shown in FIG. 1.

Figure 4A:
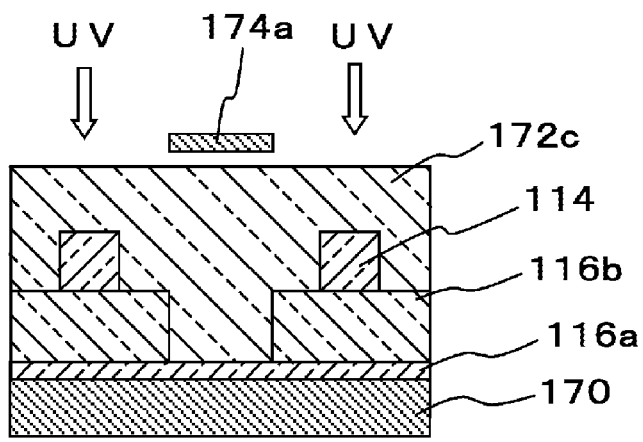
FIGS. 4A and 4B are diagrams each for showing an example of a manufacturing step of the embodiment of the optical waveguide according to the invention.

Next, as shown in FIG. 4A, a thin film 172c for forming the overcladding layer 116c is applied by a predetermined thickness onto the undercladding layer 116b formed on the buffer-cladding layer 116a and the core layer 114 with UV curing acrylic polymer materials constituting the overcladding layer 116c.

Additionally, UV is irradiated toward the thin film 172c for forming the overcladding layer 116c via the photo mask 174a by which patterns of the fiber guide grooves 120 can be formed, so that the thin film 172c other than the portions to be formed as the fiber guide grooves 120 can be cured.

Figure 4B:
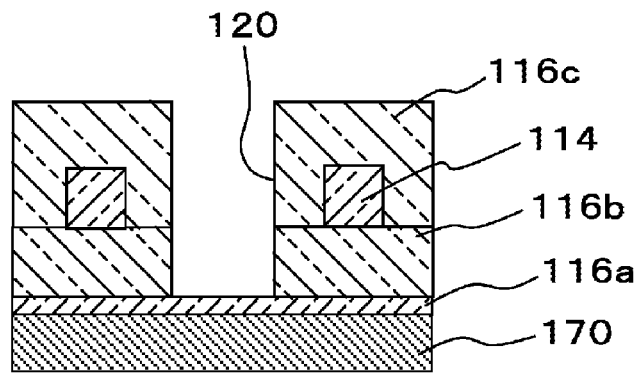

As shown in FIG. 4B, the thin film 172c other than the cured portions thereof is developed by solution as to be removed therefrom. The thin film 172c in which the fiber guide grooves 120 have been formed is treated by heat as to be formed as the overcladding layer 116c.

Further, a thin film 176 for forming the stepwise portion 122 is applied by a predetermined thickness onto the overcladding layer 116c with UV curing acrylic polymer materials constituting the stepwise portion 122. It is to be noted that the thin film 176 for forming the stepwise portion 122 is made of the same materials as that constituting the overcladding layer 116c.

Figure 5A:
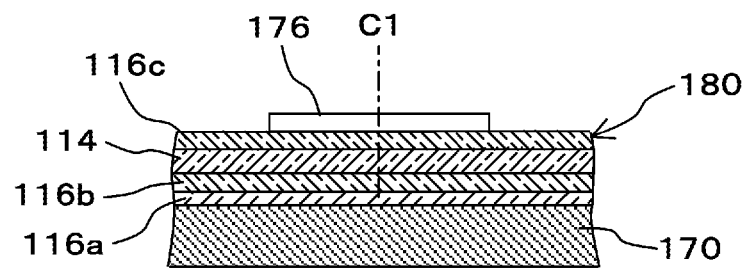
FIGS. 5A through 5C are diagrams each for showing an example of a manufacturing step of the embodiment of the optical waveguide according to the invention.

UV is then irradiated toward the thin film 176 for forming the stepwise portion 122 via a photo mask by which patterns of the stepwise portion 122 can be formed so that the portions of the thin film 176 to be formed as the stepwise portion 122 can be cured. The thin film 176 other than the cured portions thereof is developed by solution as to be removed therefrom. Such the removed thin film 176 is treated by heat as to be formed as the stepwise portion 122 on the overcladding layer 116c, as shown in FIG. 5A.

Thus, a waveguide sheet 180 in which the core layers 114 with predetermined patterns are formed, the fiber guide grooves 120 are formed over the buffer-cladding layer 116a, and the stepwise portion 122 is formed on the overcladding layer 116c at the predetermined position thereof is manufactured on the wafer substrate 170.

Figure 5B:
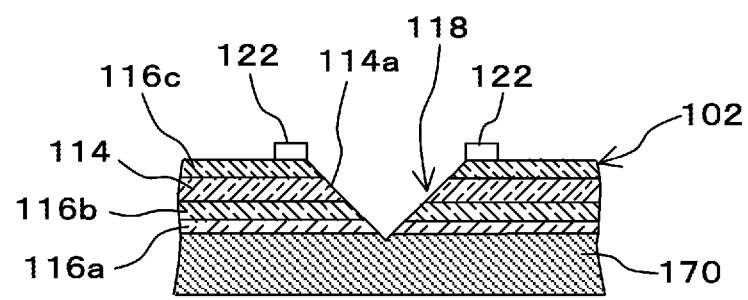

Next, as shown in FIG. 5B, the waveguide sheet 180 is cut by a dicing cutter. Along a cut position C1 for cutting the waveguide sheet 180 to form the inclined end surface 118 shown in FIG. 2, a mirror cut blade, not shown, having V-shaped section cuts the waveguide sheet 180. This allows inclined end surfaces 118, which have about 45 degrees, of the waveguide sheet 180 to be formed across the core layers 144 on the cut position C1. This also allows the stepwise portion 122 to be cut to form the stepwise portions 122 along upper edges of the inclined end surfaces 118.

On any cut positions of the waveguide sheet 180 other than positions forming the inclined end surfaces 118, a dicing blade, not shown, having a perpendicular section cuts the waveguide sheet 180. This enables the waveguide sheet 180 to be cut at about 90 degrees on any cut positions of the waveguide sheet 180 other than positions forming the inclined end surfaces 118, thereby allowing the waveguide sheet 180 to be divided into pieces of the optical waveguides 102 one by one.

Figure 5C:
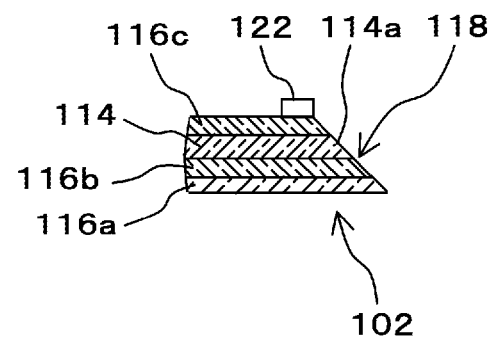

The divided piece of the optical waveguide 102 is separated from the wafer substrate 170 as shown in FIG. 5C. Thus, the optical waveguide 102 in which the core layers 114 with predetermined patterns are formed as well as the fiber guide grooves 120 and the stepwise portion 122 are formed can be manufactured.

Figure 6:
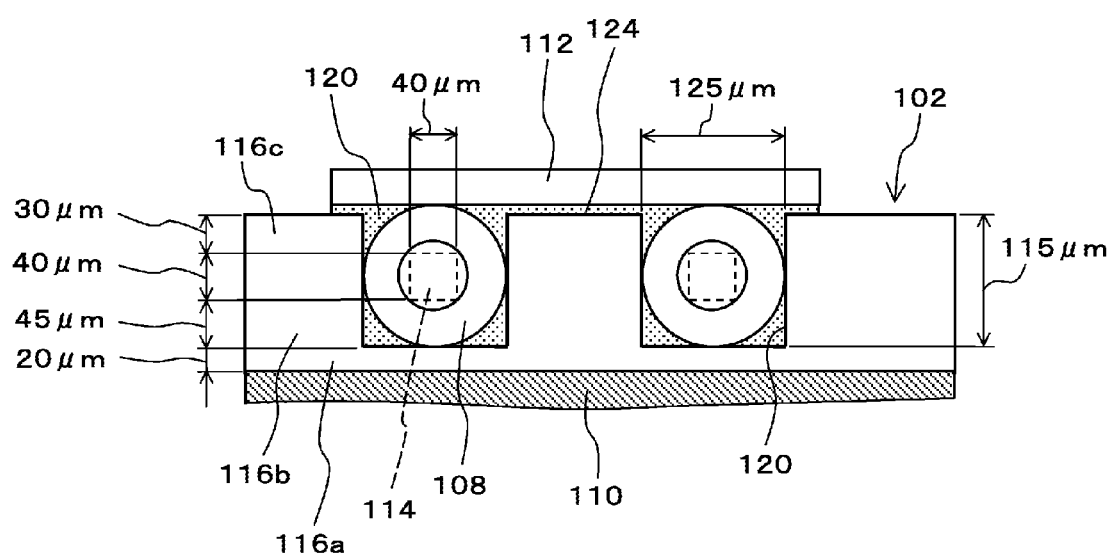
FIG. 6 is a schematic diagram for showing a relationship between each of the fiber guide grooves and a size of each of the optical fibers.

FIG. 6 shows a relationship between a size of each of the fiber guide grooves 120 and a size of each of the optical fibers 108, which shows an example of any sizes in the optical waveguide 102.

The optical waveguide 102 thus manufactured has a configuration of a width of 4 mm along a direction where each of the core layers 114 extends and a length of 5 mm across the direction where each of the core layers 114 extends.

Each of the core layers 114 has a height of about 40 μm and a width of about 40 μm. The buffer-cladding layer 116a has a thickness of about 20 μm. The undercladding layer 116b has a thickness of about 45 μm. The overcladding layer 116c has a part with a thickness of about 30 μm, which is over the core layer 114.

Each of the fiber guide grooves 120 extends from an upper surface of the overcladding layer 116c up to an upper surface of the buffer-cladding layer 116a and has a depth of about 115 μm.

Each of the fiber guide grooves 120 has a width of about 125 μm in order to use the optical fiber for multi-modes in which any optical signals with a basic mode and at least one higher mode are transferred.

The stepwise portion 122 has a width of about 30 μm along a direction where each of the core layers 114 extends (see FIG. 7) and any heights, which will be described later.

The holding cover 112 has a configuration of a width of about 3.8 μm and a length of about 4.5 μm, which corresponds to the configuration of the optical waveguide 102. The holding cover 112 has a thickness of about 0.5 mm.

The following will describe a method of manufacturing embodiments of the optical module 100 according to the invention.

On manufacturing the embodiments of the optical module 100 according to the invention, the board 110 mounts the VCSEL 104 and the PD 106 and then mounts the optical waveguide 102; and the optical waveguide 102 that has been mounted on the board 110 mounts the optical fibers 108 and the holding cover 112.

Further, first, the part 110a of the board 110 mounts the VCSEL 104 and the PD 106 using any marks, not shown, indicating their reference positions. The VCSEL 104 and the PD 106 are electrically connected to any electronic equipment such as a driver IC and a receiver IC, not shown, by means of wire bonding.

Next, the optical waveguide 102 is positioned at a mark, not shown, on the board 110 so that the inclined end surface 114a of the core layer 114, which is exposed at the inclined end surface 118 of the optical waveguide 102, can be positioned just above a light-emitting portion of the VCSEL 104 and the other inclined end surface 114a of the other core layer 114, which is also exposed at the inclined end surface 118 of the optical waveguide 102, can be positioned just above a light-receiving portion of the PD 106. The optical waveguide 102 is then bonded to the board 110 by any adhesive agent. As the adhesive agent, UV cure adhesive agent is used because light having a wave length corresponding to the UV can pass through the optical waveguide 102.

Next, the optical fibers 108 are respectively inserted into the fiber guide grooves 120 and the holding cover 112 lies on the optical fibers 108. As described above, when each of the optical fibers 108 is inserted into each of the fiber guide grooves 120 in the optical waveguide 102, a gap does not almost occur between an outer circumference of each of the optical fibers 108 and an inner wall of the undercladding layer 116b and the overcladding layer 116c constituting each of the fiber guide grooves 120, thereby limiting any radical movement of each of the optical fibers 108.

Each of the fiber guide grooves 120 has a depth that is slightly smaller than a diameter of each of the optical fibers 108. This enables each of the core layers 114 of the optical waveguide 102 and the core 108a of each of the optical fibers 108 to be aligned by pushing each of the optical fibers 108 downwardly when the optical fibers 108 are respectively inserted into the fiber guide grooves 120 and the holding cover 112 lies on the optical fibers 108.

Any UV cure adhesive agent is injected into a space between the lower surface of the holding cover 112 and the upper surface 126 of the overcladding layer 116c as the adhesive agent 124 while the optical fibers 108 are respectively inserted into the fiber guide grooves 120 and the holding cover 112 lies on the optical fibers 108.

The adhesive agent 124 injected into the space between the lower surface of the holding cover 112 and the upper surface 126 of the overcladding layer 116c flows along an entire lower surface of the holding cover 112.

At the vicinity of the inclined end surface 118 of the optical waveguide 102, the stepwise portion 122 limits an extent of flow of the adhesive agent 124, which prevents the adhesive agent 124 from flowing out downward on or near the inclined end surface 114a of each of the core layers 114. At the same time, the adhesive agent 124 can be flown surely up to a base of the stepwise portion 122 so that the adhesive agent 124 can be flown into the space between the holding cover 112 and the optical waveguide 102 along an upper edge of the inclined end surface 118.

UV is then irradiated into the adhesive agent 124 through the holding cover 112 so that the adhesive agent 124 can be cured, thereby enabling the holding cover 112 to be bonded to the optical waveguide 102.

The adhesive agent 124 injected under the lower surface of the holding cover 112 is flown into the fiber guide grooves 120 where the optical fibers 108 are inserted, any clearance between a part of each of the optical fibers 108, which projects from the optical waveguide 102, and the holding cover 112, and any clearance between the stepwise portion 122 of the optical waveguide 102 and the end surface of the holding cover 112. This enables each of the optical fibers 108 and the holding cover 112 to be bonded to the optical waveguide 102.

Thus, each of the optical fibers 108 inserted into the fiber guide grooves 120 is fixed to the optical waveguide 102 with core 108a of each of the optical fibers 108 being aligned into each of the core layers 114 of the optical waveguide 102. The holding cover 112 has a configuration such that the holding cover 112 can cover almost the entire upper surface of the optical waveguide 102.

As described above, the stepwise portion 122 limits an extent of flow of the adhesive agent 124 injected into the space between the holding cover 112 and the optical waveguide 102, which prevents the adhesive agent 124 from flowing out. This also avoids the adhesive agent 124 flowing out downward on or near the inclined end surface 114a of any core layers 114 and being cured by UV irradiation to remain on the inclined end surface 114a.

It is to be noted that the buffer-cladding layer 116a constitutes a bottom of the channel of the fiber guide groove 120 and the board 110 is not exposed at the bottom thereof. Although, as described above, the optical waveguide 102 has been bonded to the board 110, the adhesive agent 124 for bonding the optical fibers 108 can be flown into a space between the optical waveguide 102 and the board 110, which are made of different materials, if the board 110 is exposed at the bottom of the fiber guide groove 120, so that the optical waveguide 102 can be peeled off.

On the other hand, since, in this embodiment of the optical module 100, the buffer-cladding layer 116a constitutes the bottom of the channel of each of the fiber guide grooves 120 and the board 110 is not exposed at the bottom of the channel of each of the fiber guide grooves 120, it is possible to prevent the optical waveguide 102 from being peeled off based on the flowing-down of the adhesive agent 124.

If the optical module 100 is assembled according to such the above manufacturing method, the board 110 can mount the optical waveguide 102 after the board 110 has mounted the VCSEL 104, the PD 106 and the like. This enables the optical waveguide 102 to be mounted without applying any thermal history by high temperature by means of reflow and/or wire bonding, which are used in the mounting of electric parts, to the optical waveguide 102 that is mode of polymer materials.

The positioning of the VCSEL 104 and the PD 106 to the optical waveguide 102 can be performed by the two-dimensional movement of the optical waveguide 102, so that if using any marks, such the positioning can be realized even by using any passive alignment without driving any optical elements.

Forming the fiber guide grooves 120 in the optical waveguide 102 into which the optical fibers 108 are inserted allows any optical coupling between the optical waveguide 102 and the each of the optical fibers 108 to be realized by using any passive alignment.

It is to be noted that a width of each of the fiber guide grooves 120 formed by photo lithographic process has accuracy of .+−.some μm. The optical fiber 108 for multi-modes approves an error of about .+−.10 μm upon the optical coupling thereof. This allows high accuracy of alignment between the core 108a of each of the optical fibers 108 and each of the core layers 114 of the optical waveguide 102 to be realized by forming the fiber guide grooves 120 by the photo lithographic process as shown in FIGS. 3A through 5C.

Bonding the optical waveguide 102 to the board 110 using UV cure adhesive agent and bonding the holding cover 112 and the optical fibers 108 to the optical waveguide 102 using UV cure adhesive agent 124 allows them to be bonded to each other in a short time without applying any thermal history to the optical waveguide 102.

The following will describe operations of the embodiments of the optical module 100 according to the invention with reference to FIGS. 1 and 2.

When the VCSEL 104 receives any electric signals, the VCSEL 104 converts the electric signals into any corresponding optical signals and emits the optical signals.

The optical signals emitted from the VCSEL 104 are launched into the lower surface 130 of the optical waveguide 102 at almost right angles. The inclined end surface 114a of the core layer 114, which is exposed at the inclined end surface 118 of the optical waveguide 102, totally reflects the launched optical signals to bend their optical paths up to about right angles, so that the bent optical signals can be launched into the core layer 114 and transferred to the core layer 114. The optical signals transferred from the core layer 114 are launched into the optical fiber 108 and the launched optical signals are transferred to the optical fiber 108 to reach any equipment, not shown.

Any optical signals emitted from the equipment and transferred to the other optical fiber 108 are launched into the other core layer 114 and transferred toward the inclined end surface 114a of the corresponding core layer 114. The optical signals transferred to the other core layer 114 are totally reflected by the inclined end surface 114a of the other core layer 114, which is exposed at the inclined end surface 118 of the optical waveguide 102, to bend their optical paths up to about right angles. The bent optical signals can be launched from the other core layer 114 to the PD 106 through the lower surface 130 of the optical waveguide 102. The PD 106 then receives the optical signals. The PD 106 converts the received optical signals to any corresponding electric signals, which are output through any electric wiring, not shown.

According to the embodiment of the optical module 100 according to the invention, the holding cover 112 made of transparent inorganic materials such as heat-resistant glass, which has thermal expansion coefficient that is smaller than that of the optical waveguide 102 and is close to that of the board 110 made of silicon, is bonded to the optical waveguide 102. The holding cover 112 also covers the optical waveguide 102.

This causes the optical waveguide 102 to be sandwiched between the holding cover 112 and the board 110, which have smaller thermal expansion coefficients, thereby preventing the optical waveguide 102 from being expanded and contracted when any thermal shock is applied to them to avoid any difference in a positional relationship between the optical waveguide 102 and the optical element and/or occurrence of any cracks.

According to the embodiment of the optical module 100 according to the invention, the holding cover 112 covers the optical waveguide 102 including the connections 132 where each of the optical fibers 108 and each of the core layers 114 are connected to each other.

This restrains the vicinity of each of the connections 132 from being expanded and contracted under any environment of high temperature, thereby preventing the adhesive agent 124 by which the optical fibers 108 are bonded from being expanded and contracted to avoid an increase in the connection loss.

According to the embodiment of the optical module 100 according to the invention, the holding cover 112 has an area by which a region extending from a part of each of the optical fibers 108 inserted into the fiber guide grooves 120 up to the vicinity of the inclined end surface 118 of the optical waveguide 102, particularly, an optical-element-coupling section 134 where the VCSEL 104 or the PD 106 is optically coupled with the optical waveguide 102, through a connection 132 between each of the optical fibers 108 and each of the core layers 114 in the optical waveguide 102 can be covered.

This allows the holding cover 112 to cover almost whole of an upper surface of the optical waveguide 102, thereby preventing whole of the optical waveguide 102 from being expanded and contracted when any thermal shock is applied to them.

According to the embodiment of the optical module 100 according to the invention, in each of the optical-element-coupling sections 134, the stepwise portion 122 limits an extent of flow of the adhesive agent 124 by which the holding cover 112 is bonded, thereby preventing the adhesive agent 124 from being cured and remained with it flowing out.

This prevents the refractive index at the inclined end surface 114a of each of the core layers 114 from altering to increase the connection loss thereof.

According to the embodiment of the optical module 100 according to the invention, the adhesive agent 124 by which the holding cover 112 is bonded can flow surely up to the base of the stepwise portion 122. This enables the holding cover 112 to hold the region up to the vicinity of the inclined end surface 118 of the optical waveguide 102.

The optical elements are mounted under the inclined end surface 114a of each of the core layers 114 of the optical waveguide 102 so that the optical waveguide 102 is spatially away from the board 110 near the inclined end surface 114a. Holding the region up to the vicinity of the inclined end surface 118 of the optical waveguide 102 by the holding cover 112 enables any deformation of the optical waveguide 102 at the vicinity of the inclined end surface 118 thereof to refrain, thereby preventing the connection loss thereof from being increased.

The following will describe a comparison of the embodiments of the optical module 100 according to the invention in which the stepwise portion 122 is provided with an optical module 10 as a comparison example in which no stepwise portion is provided.

Figure 7:
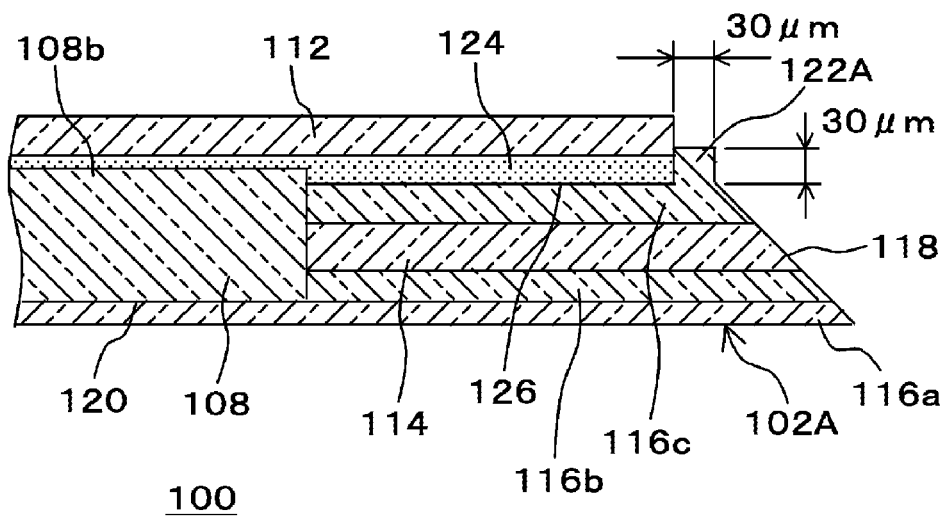
FIG. 7 is a cross-sectional view of the optical module for showing an important portion thereof including a first embodiment of the optical waveguide according to the invention.
Figure 8:
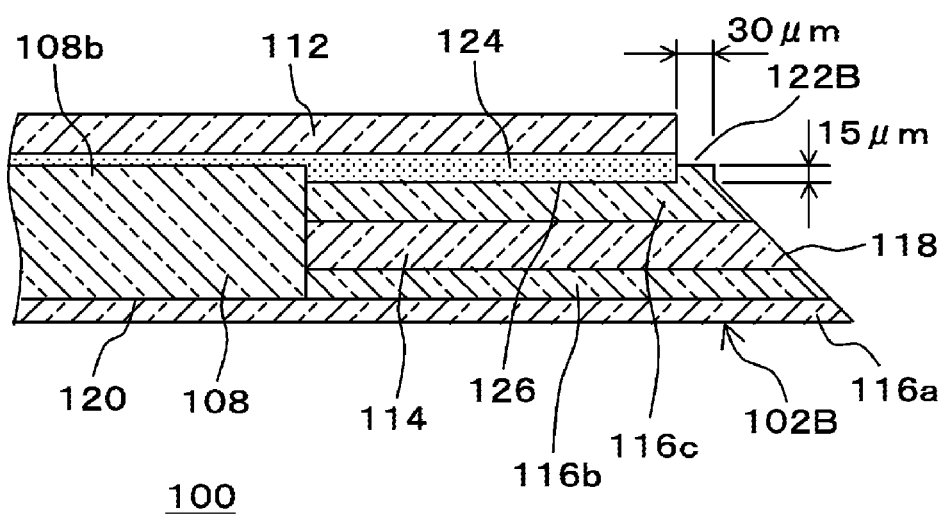
FIG. 8 is a cross-sectional view of the optical module for showing an important portion thereof including a second embodiment of the optical waveguide according to the invention.
Figure 9:
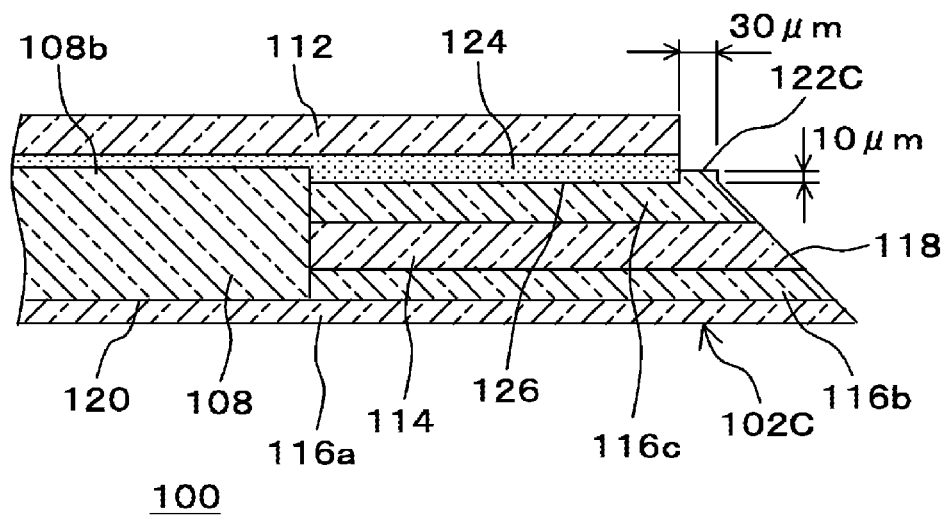
FIG. 9 is a cross-sectional view of the optical module for showing an important portion thereof including a third embodiment of the optical waveguide according to the invention.

FIGS. 7 through 9 show embodiments of the optical module 100 according to the invention including the embodiments of the optical waveguide 102 according to the invention.

FIG. 7 shows an important portion of the optical module 100 including a first embodiment of the optical waveguide 102A. FIG. 8 shows an important portion of the optical module 100 including a second embodiment of the optical waveguide 102B. FIG. 9 shows an important portion of the optical module 100 including a third embodiment of the optical waveguide 102C.

In the embodiments of the optical waveguide 102A through 102C, each of the stepwise portions 122A through 122C has a width of 30 µm. In the first embodiment of the optical waveguide 102A, the stepwise portion 122A has a height of 30 µm. In the second embodiment of the optical waveguide 102B, the stepwise portion 122B has a height of 15 µm. In the third embodiment of the optical waveguide 102C, the stepwise portion 122C has a height of 10 µm.

In the first embodiment of the optical waveguide 102A, a top of the stepwise portion 122A has a level that is higher than that of a side 108b of any optical fibers 108 inserted into the fiber guide grooves 120, which projects from the upper surface 126 of the overcladding layer 116c of the optical waveguide 102A (see FIG. 7).

In the second embodiment of the optical waveguide 102B, a top of the stepwise portion 122B has a level that is identical to that of a side 108b of any optical fibers 108 inserted into the fiber guide grooves 120, which projects from the upper surface 126 of the overcladding layer 116c of the optical waveguide 102B (see FIG. 8).

In the third embodiment of the optical waveguide 102C, a top of the stepwise portion 122C has a level that is lower than that of a side 108b of any optical fibers 108 inserted into the fiber guide grooves 120, which projects from the upper surface 126 of the overcladding layer 116c of the optical waveguide 102C (see FIG. 9).

Figure 10:
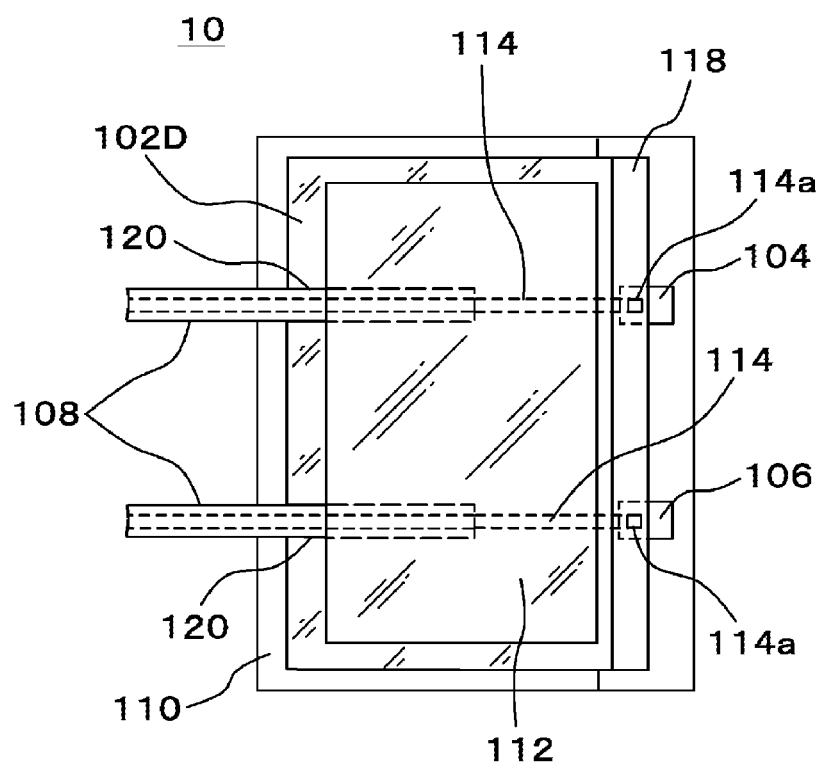
FIG. 10 is a top plan view of an optical module as a comparison example for showing a configuration thereof, in which an optical waveguide is provided.
Figure 11:
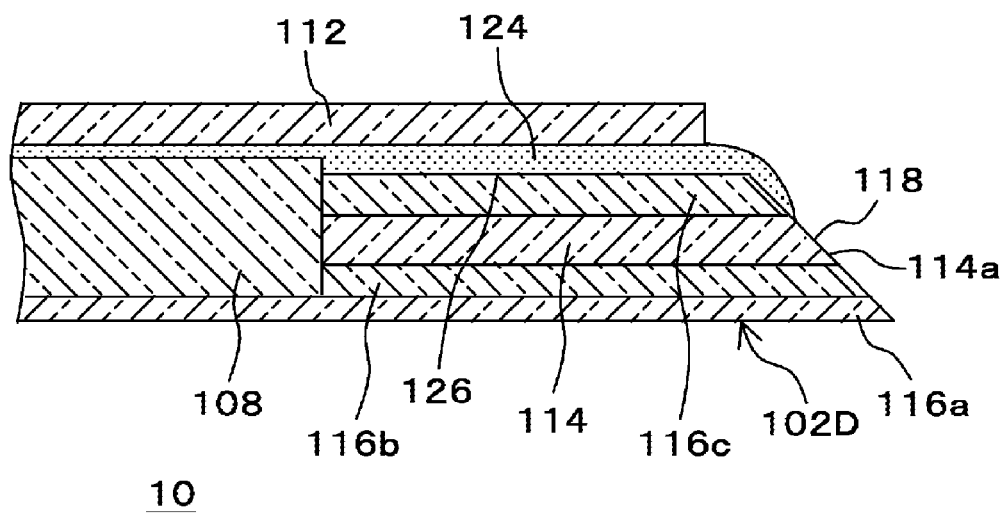
FIG. 11 is a cross-sectional view of the optical module shown in FIG. 10 for showing an important portion thereof.

FIGS. 10 and 11 show a configuration of the optical module 10 as a comparison example in which an optical waveguide 102D is provided.

The optical module 10 and the optical waveguide 102D as the comparison example have the same configurations as those of the optical module 100 and the optical waveguide 102 shown in FIGS. 1 and 2 without providing any stepwise portion 122 on the upper surface 126 of the overcladding layer 116c of the optical waveguide 102D.

The optical modules 100 as shown in FIGS. 7 through 9 and the optical module 10 as shown in FIGS. 10 and 11 are manufactured according to the manufacturing method as described above. In all of the optical modules 100 in which the first through third embodiments of the optical waveguides 102A through 102C are provided, any adhesive agent 124 is not flowing out downward on or near the inclined end surface 114a of each of the core layers 114. On the other hands, in the optical module 10 as the comparison example, an adhesive agent 124 is flowing out downward into the inclined end surface 114a of each of the core layers 114.

As the first embodiment of the optical waveguide 102A, when the top of the stepwise portion 122A has a level that is higher than that of a side 108b of any optical fibers 108 inserted into the fiber guide grooves 120, the holding cover 112 can be positioned to the stepwise portion 122A if the holding cover 112 hits against the stepwise portion 122A.

Although the stepwise portions 122A through 122C have had a width of 30 µm in the embodiments of the optical waveguides, this invention is not limited to those. The stepwise portion can have a width of more or less than 30 µm. In order to prevent any alteration by expansion and contraction of the optical waveguide to keep any reliability thereof, the stepwise portion preferably has a width of less than 100 µm, particularly, 50 µm so that a distance between an end of the holding cover 112 and an upper end of the inclined end surface 118 may be preferably of less than 100 µm, particularly, 50 µm.

Figure 12:
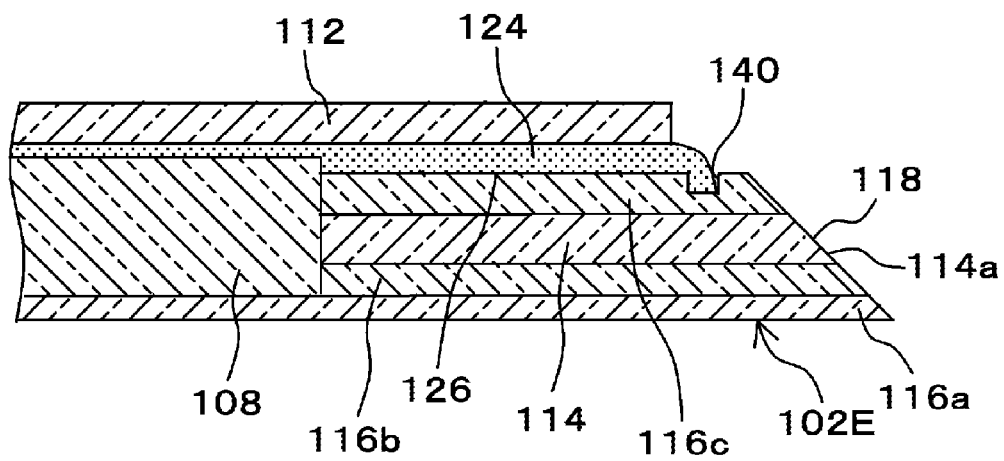
FIG. 12 is a cross-sectional view of the optical module for showing an important portion thereof including a fourth embodiment of the optical waveguide according to the invention.

Although the line-like stepwise portions have been provided on the upper surface of the overcladding layer of the optical waveguide along the inclined surface of the optical waveguide as the system for preventing adhesive agent from flowing out, this invention is not limited thereto. An optical waveguide 102E having the system for preventing adhesive agent from flowing out downward into the inclined end surface of each of the core layers may be provided. For example, this system may have a configuration with a groove 140 as shown in FIG. 12. The groove 140 has a capacity such that it is adequate to contain therein the whole of the adhesive agent to be flowing out.

Although the optical waveguide 102 has been made of acrylic polymer materials, this invention is not limited thereto. The optical waveguide 102 may be made of epoxy polymer materials, and inorganic polymer materials having any siloxane structure of Si—O—Si. The optical waveguide may have any other configurations than those of the above embodiments.

Although the optical module has been provided as the optical module for transmission and reception including the VCSEL 104 and the PD 106 as the optical elements in the above embodiments, this invention is not limited thereto. The optical module may be configured so as to be the optical module for transmission including the VCSEL 104 or for reception including the PD.

This invention is applicable to an optical waveguide and an optical module that are available for an optical communication module between boards or chips in electronic equipment, a connector of a communication cable using optical fibers or the like. It should be understood by those skilled in the art that various modifications, combinations, sub-combinations and alternations may occur depending on design requirements and other factors insofar as they are within the scope of the appended claims or the equivalents thereof.

What is claimed is:

1. An optical waveguide comprising:
   a core layer through which light is transferred;
   an inclined edge at an end of said core layer the inclined edge reflecting light from the core layer to outside or light from the outside to the core layer; and
   a cladding layer comprising a buffer-cladding layer, an undercladding layer and an overcladding layer that clads the core layer,
   wherein,
      said cladding layer has at least one fiber guide groove,
      an optical fiber inserted in said fiber guide groove and aligned with said core layer, and
      said overcladding layer includes an end portion which extends to the inclined edge of said core layer and along the incline surface forming a stepwise portion having a height equal to or greater than a projected portion of said optical fiber that prevents an adhesive agent from flowing out of an upper surface of said overcladding layer.

2. The optical waveguide according to claim 1 wherein the stepwise portion has a width of about 30 μm.

3. The optical waveguide according to claim 1 wherein the optical waveguide is made of polymer material.

4. An optical module comprising a board and an optical waveguide on the board, said optical waveguide further comprising:
   a core layer through which light is transferred;
   an inclined edge at an end of said core layer, the inclined edge reflecting light from the core layer to outside or light from the outside to the core layer; a cladding layer comprising a buffer-cladding layer, an undercladding layer and an overcladding layer that clads the core layer;
   an optical element that receives or emits the light on the board under the optical waveguide opposite to the inclined edge of the core layer in the optical waveguide; and
   a holding member that holds the optical waveguide; and
   an adhesive agent that bonds said holding member to said cladding layer,
   wherein,
      said cladding layer has at least one fiber guide groove,
      an optical fiber inserted in said fiber guide groove and aligned with said core layer, and
      said overcladding layer includes an end portion which extends to the inclined edge of said core layer and along the incline surface forming a stepwise portion having a height equal to or greater than a projected portion of said optical fiber that prevents an adhesive agent from flowing out of an upper surface of said overcladding layer.

5. The optical module according to claim 4 wherein the holding member covers the optical fiber that is inserted into the fiber guide groove,
   the optical waveguide touches said optical fiber and is close to the inclined edge of the core layer in the optical waveguide.

6. The optical module according to claim 4 wherein the optical waveguide is made of polymer material.

* * * * *